(12) United States Patent
Sepelak et al.

(10) Patent No.: US 6,356,460 B1
(45) Date of Patent: Mar. 12, 2002

(54) ELEVATED NEUTRAL BASE FOR SWITCHES

(75) Inventors: James G. Sepelak, Bellefontaine; Tod T. Lament, West Liberty; Dan A. Fisher, Marysville; Steve E. Pever, Bellefontaine, all of OH (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/605,050

(22) Filed: Jun. 28, 2000

(51) Int. Cl.[7] .............................. H01R 9/00; H01H 9/00
(52) U.S. Cl. ..................... 361/823; 200/293; 361/826

(58) Field of Search .............................. 200/293–307, 200/252–261; 361/627–834

(56) References Cited

U.S. PATENT DOCUMENTS

| | | | | |
|---|---|---|---|---|
| 5,430,619 A | * | 7/1995 | Lindenbaum | 361/823 |
| 5,475,191 A | * | 12/1995 | Doudon | 200/252 X |
| 5,737,195 A | * | 4/1998 | Cassity et al. | 361/823 |

* cited by examiner

Primary Examiner—J. R. Scott

(57) ABSTRACT

An elevated neutral base for switches forming an open space for positioning of insulated electric wires.

4 Claims, 2 Drawing Sheets

ELEVATED NEUTRAL BASE FOR SWITCHES

FIELD OF THE INVENTION

The present invention relates to fusible and/or disconnect switches and the like, and more particularly to those switches which may have a modular interior that incorporates a base to facilitate the assembly of interchangeable components, including neutral assemblies.

BACKGROUND OF THE INVENTION

Fusible and non-fused switches, disconnect switches and electrical circuit breakers are used to distribute power for residential, commercial and industrial applications. As the need arises to distribute greater amounts of power through the enclosures that house such switches and circuit breakers, there is an impetus to increase the electrical rating as a result of the higher voltage and current density whereas the impetus with respect to the size of the enclosure housing the electrical parts is either to retain the same sized enclosure or to make it even smaller to accommodate the ever decreasing space allocated for installation of such devices.

Decreased space within the enclosure typically occurs as a result of the need to install additional electrical/mechanical components or can result due to the use of standard modular interiors. Such decreased space within the interior of the enclosure thereby provides less and less room for maneuvering, and more particularly less room for the installation of electrical wires by electricians in the field and other end users. Typically, the space reserved for the placement of wires within the enclosure and known as gutter space is inadequate and places constraints upon the electrician in the field.

It would therefore be an advantage over prior art devices to provide an increased space within an enclosure for the placement of wires without the need to increase the dimensions of the enclosure.

SUMMARY OF THE INVENTION

In accordance with the present invention a switch device is disclosed comprising a switch housing having a back wall, stationary contacts disposed within the switch housing, a contact switching element with moving contacts moveable in the interior of the switch housing, an actuating member which is moveable in the interior of the switch housing for transferring by a rotational motion of the actuating member the moving contacts for engagement and disengagement with the stationary contacts, a neutral assembly, an insulating member disposed within the switch housing, the insulating member forming an elevated laterally extending member for mounting thereon the neutral assembly, the insulating member forming an open space between the back wall of the switch housing for the routing of insulated electric wires.

DESCRIPTION OF THE INVENTION

Figure 1:
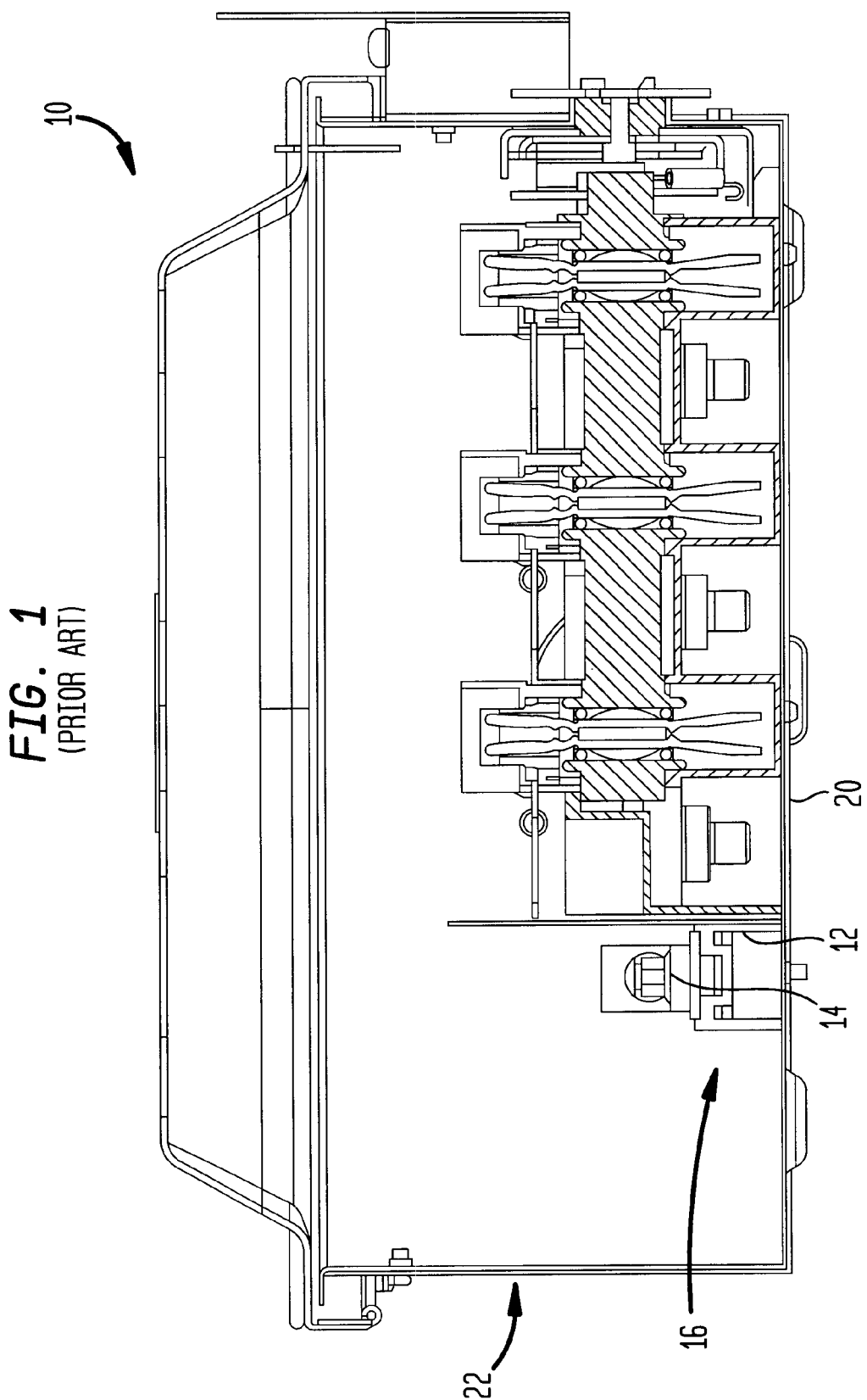
FIG. 1 is a cross-sectional view of a prior art switch.
Figure 2:
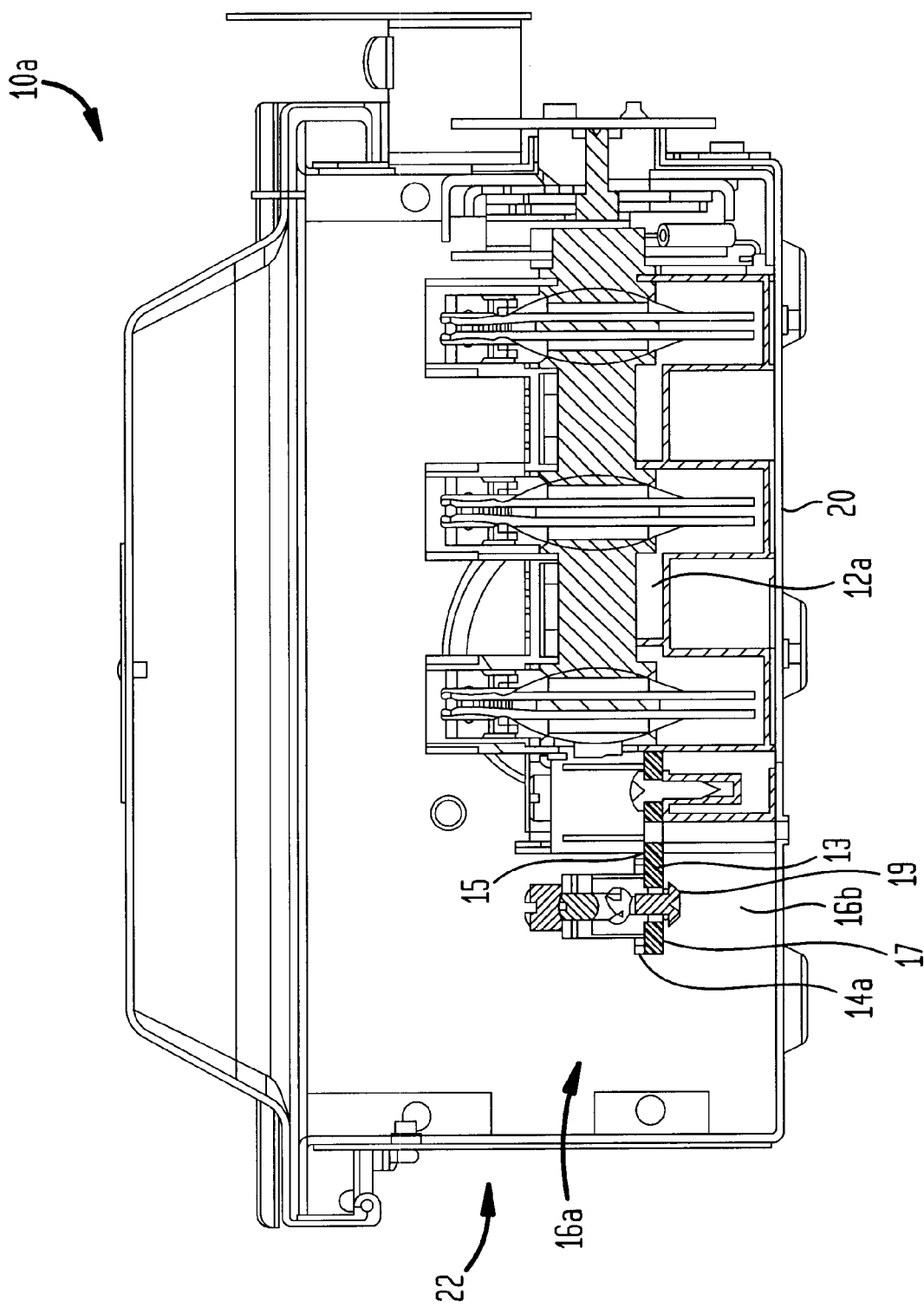
FIG. 2 is a cross-sectional view of a switch in accordance with the present invention.

The amount of room allocated for the physical placement of wires known as the gutter space in many electrical devices is inadequate. Neutral lugs and/or neutral assemblies are typically mounted on insulated base(s) which can be either integral with or separate from the insulated base of the device and are typically positioned in the gutter space. Referring specifically to FIG. 1 which is a cross-sectional view of a typical prior art switch 10 depicting the elements of a typical switch including an integrally formed insulated base 12 with neutral assembly 14, and other components known by those having ordinary skill in the art. An example of a switch having such components is disclosed in U.S. Pat. No. 5,475,191 which is hereby incorporated by reference in its entirety. Neutral assembly 14 is shown installed on insulating base 12, which is in contract with the back wall 20 of switch housing 22 and as can be seen in the FIG. 1, takes up room that otherwise could be used for wire placement. More specifically, the National Electrical Codes and Underwriter Laboratory Standards require that after wiring of the switch, lugs on neutrals are to be accessible to be tightened and/or loosened, and otherwise be accessible for test purposes. Such codes prohibit the positioning of wires on top of the neutral as well as laterally over the top of the neutral. In order to comply with such standards and codes, the installer must place the rest of the wiring for the switch within the gutter space 16 but around and not above the neutral.

In accordance with the present invention, additional room for the placement of wires in the gutter 16a is provided by eliminating the attachment of the neutral assembly 14a to the insulating base member of the prior art and attaching it instead to an elevated laterally extending member 13 of an insulating base 12a (typically the switch base of an electrical switch). This thereby makes available the positioning of wires in the gutter space 16a as well as the additional space 16b beneath the base of the elevated neutral that would have otherwise been unavailable due to the presence of the neutral assembly. The elevated member need not be integral with the insulating base.

More particularly, in the disclosed embodiment, the switch 10a includes the extending member 13 which has an upper surface 15 and a lower surface 17, each extending generally parallel with respect to the back wall 20 of switch housing 22. The lower surface 17 is spaced from the back wall 20 so as to define the gutter space 16b between the extending member 13 and the back wall 20. The gutter space 16b is sized to receive wire (not shown) therein. The neutral assembly 14a is mounted on the extending member 13 so as to extend from the upper surface 15 thereof. The neutral assembly 14a is mounted to the extending member 13 by a fastener 19.

In an alternative embodiment of the present invention, the neutral assembly 14a is secured to a separate insulating base which is then secured at an elevated location either to a wall member of the insulated base or to a side or back wall of the enclosure of the electrical device. It is well understood and known in the prior art that if the neutral assembly, according to the present invention is secured to: (a) an elevated integral laterally extending member of the insulated base switch, or (b) an elevated wall of the enclosure; or (c) an insulated base which, is affixed at an elevated location to the insulated switch base of an electrical switch; appropriate electrical barriers between the neutral and the electrical elements of the switch and the enclosure is provided to protect against unintentional grounding.

While the present invention has been particularly shown and described with reference to preferred embodiments thereof, it is understood by those skilled in the art that various changes in form and details may be made therein without departing from the spirit and scope of the invention.

What is claimed:

1. An electronic device comprising:

a housing having a wall, an extending member having upper and lower surfaces extending generally parallel with respect to the wall, the lower surface being spaced from the wall so as to define a gutter space between the extending member and the wall, the gutter space being sized to receive wire therein, and a neutral assembly mounted on the extending member so as to extend from the upper surface thereof.

2. The electrical device of claim 1, wherein the electrical device is a switch.

3. The electrical device of claim 1, wherein the extending member is of electrically insulative material.

4. The electrical device of claim 1, wherein the neutral assembly is mounted to the extending member by a fastener.

* * * * *